July 23, 1968 J. I. AWEIDA ET AL 3,393,878

PNEUMATICALLY THREADED TAPE DRIVE

Filed Aug. 26, 1966 2 Sheets-Sheet 1

INVENTORS
JESSE I. AWEIDA
ROBERT B. HUMPHREY
ANTHONY W. ORLANDO
GEORGE POPP

BY Sughrue, Rothwell, Mion, Zinn & Macpeak
ATTORNEYS

July 23, 1968 J. I. AWEIDA ET AL 3,393,878

PNEUMATICALLY THREADED TAPE DRIVE

Filed Aug. 26, 1966 2 Sheets-Sheet 2

United States Patent Office 3,393,878
Patented July 23, 1968

3,393,878
PNEUMATICALLY THREADED TAPE DRIVE
Jesse I. Aweida and Robert B. Humphrey, Poughkeepsie, Anthony W. Orlando, Highland, and George Popp, Pleasant Valley, N.Y., assignors to International Business Machines Corporation, Armonk, N.Y., a corporation of New York
Filed Aug. 26, 1966, Ser. No. 575,393
4 Claims. (Cl. 242—55.12)

ABSTRACT OF THE DISCLOSURE

A pneumatic tape threading apparatus in combination with a tape handling machine having a supply reel and an open take up reel rotatably mounted thereon for rotation of spaced parallel axes, tape head means mounted thereon intermediate said reels, a pair of slack tape vacuum columns each having an open end disposed adjacent each of said reels on opposite sides of said tape head means and tape transport channel means extending between said reels past said tape head and said open ended vacuum columns, and air jet means mounted along said channel and angled relative thereto in the direction of tape threading movement with at least some of said air jets being located immediately adjacent the opened end of said vacuum columns and angled to blow directly across the open ends of said vacuum columns to assist in the transport of a tape across the open ends.

The present invention is directed to a novel apparatus for threading tape and tape drives by use of pneumatic means and without the use of a leader or any type of attachment to the end of the tape.

The present invention is also directed to a novel means which is adapted to cooperate with the supply reel when the reel is provided with a wrap-around enclosure in the form of a cartridge in which the reel is mounted prior to being connected to the tape threading apparatus or when the reel is not provided with a cartridge housing.

The present invention is also directed to an improved means for directing the tape from the supply reel by pneumatic means and further directing and guiding the tape along a passage past a head assembly to a take-up reel. The improved guiding means comprises a combination of opposed air jets whereby flutter of the leading end of the tape as it passes the head assembly is substantially eliminated. The present invention further provides for the automatic attaching of the tape on a non-enclosed take-up reel solely by pneumatic means.

Other features of the invention will be pointed out in the following description and claims and illustrated in the accompanying drawings, which disclose, by way of example, the principles of the invention and the best mode which has been contemplated of applying these principles.

Generally speaking, the present invention is directed to a pneumatic threading apparatus for tape drives wherein an open reel or a cartridge enclosed reel may be mounted at the supply station of the apparatus. In either case, the free end of the tape on the reel will be automatically fed into a tape transport channel along which the free end of the tape will be transported to a take-up reel. The leading end of the tape is fed past a head assembly in said channel by means of a plurality of opposed air jets which are directed on opposite surfaces of the tape at an angle in the direction of the take-up reel. Upon reaching the take-up reel, vacuum from the take-up hub attracts the end of the tape to the hub where it will be held in close engagement with the hub by means of vacuum ports disposed about the circumference of the hub.

Figure 1:
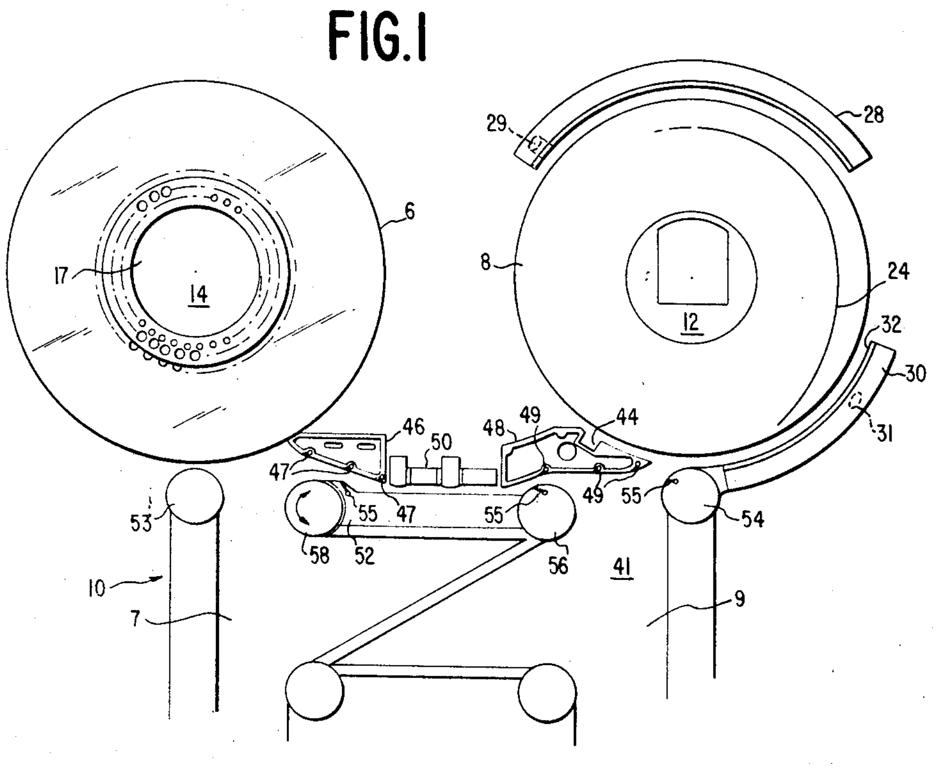
FIGURE 1 is a side elevational view, partly in section, of the pneumatic threading means as used with a non-enclosed supply reel.

Turning now to FIGURE 1, the apparatus is comprised of a main support or table member 10 upon which a supply reel 8 and a take-up reel 6 are journaled in spaced relation on parallel hubs 12 and 14 respectively. The main member 10 is provided with a pair of vacuum columns 7 and 9 of usual construction. The specific drive means for the reels have not been shown since such features are not critical to the present invention and any suitable means may be utilized.

The supply reel 12 has a supply of tape 24 wound thereon and outer circumference of the reel need not be enclosed (FIGURE 1). However, the reel may be enclosed in a wrap-around cartridge 26 (FIGURE 2) of the type disclosed in U.S. patent application Ser. No. 577,883, titled "Toggle Latching Reel Cover With a Sliding Door," filed on Sept. 8, 1966 and assigned to the assignee of the present application.

Figure 2:
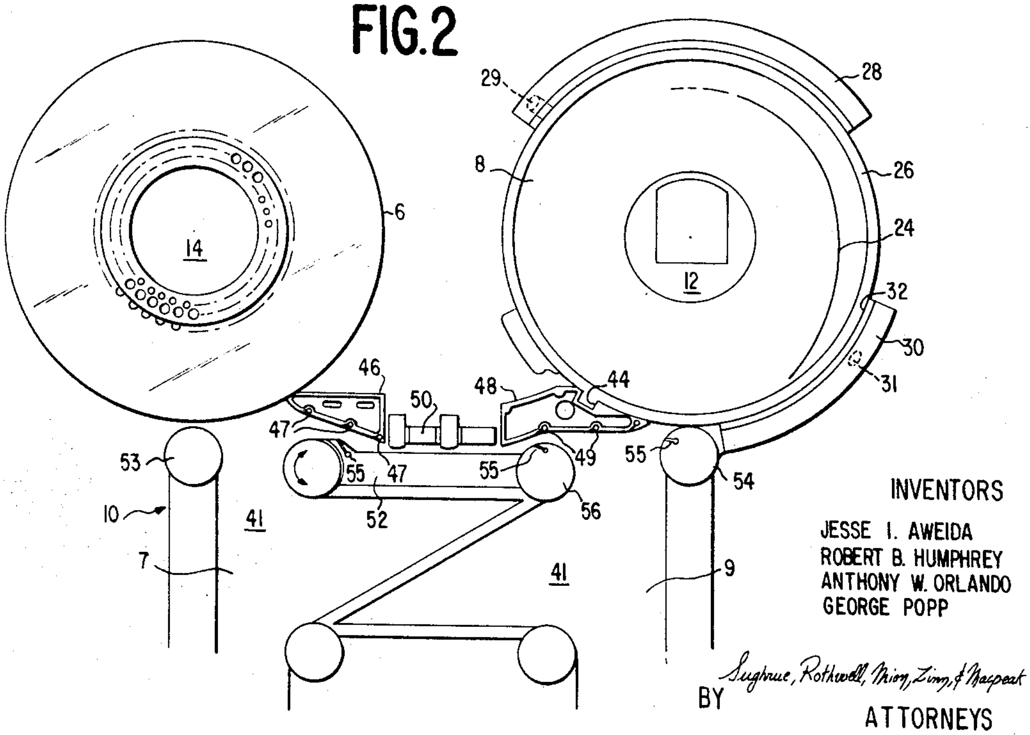
FIGURE 2 is a side elevational view partly in section of the pneumatic threading means as used with a cartridge enclosed supply reel.
Figure 3:
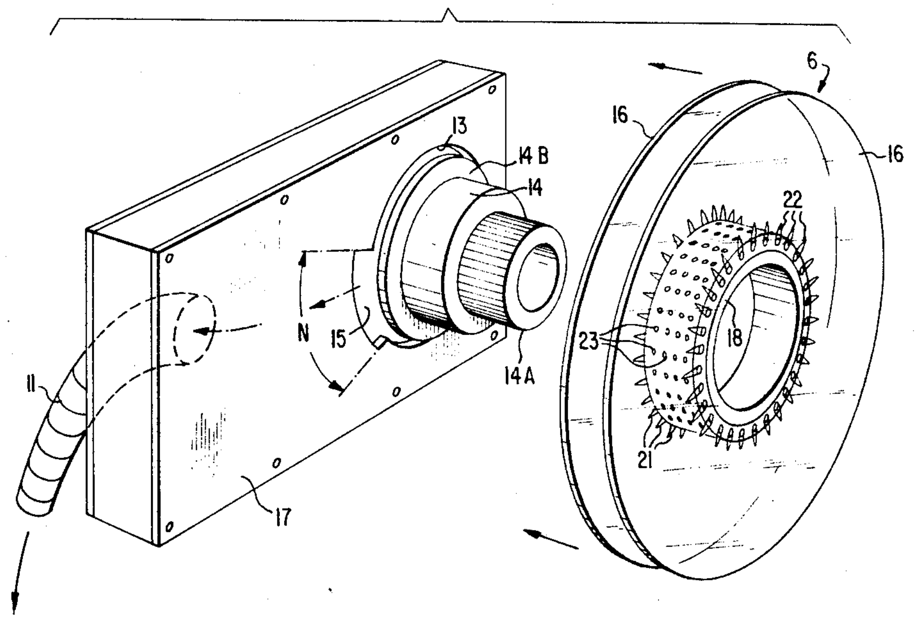
FIGURE 3 is a perspective view of a modified form of take-up reel and mounting means therefor.
Figure 4:
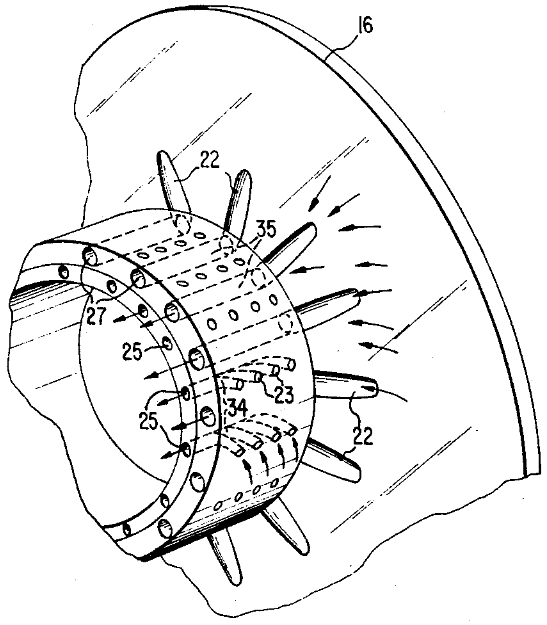
FIGURE 4 is a perspective view, partly in section of the reel in FIGURE 4.

In FIGURE 1 and FIGURE 2 a pair of restrainers 28 and 30 are mounted on the frame of the machine (not shown) and are provided with air pressure inlet means 29 and 31 respectively. The air pressure inlet 29 in restrainer 28 is utilized only when the tape reel is enclosed in a cartridge and will cooperate with the cartridge (in a manner described in detail in applicants' above-identified copending application) to provide air under pressure to the interior of the cartridge to feed the free end of the tape about the interior of the cartridge as the reel is rotated and to peel the free end of the tape from the body of tape wound on the reel and feed said free end outwardly of the cartridge into the tape transport channel. The cartridge is located relative to the restrainers by key 44.

The lower restrainer 30 is provided with an anti-friction tape feed surface 32 on the interior curved portion thereof. When a reel 8 is located at the supply position without a cartridge in the manner shown in FIGURE 1, the reel should initially be mounted with the free end of the tape disposed adjacent the anti-friction surface 32 as shown in FIGURE 1. Thus upon rotation of the reel in the unwinding direction the free end of the tape will slide freely over surface 32 into the tape transport channel.

In the comstruction shown in FIGURE 1 the restrainer 30 may be formed as a hollow curved tube or channel with pressurized air supplied to the interior thereof by means of inlet means 31. The surface 32 may be of porous bronze whereby the air under pressure in the interior of restrainer 30 may be bled therethrough to provide an air lubricated surface over which the free end of the tape may slide. In lieu of the air lubrication, the surface 32 could also be formed from any other suitable anti-friction material such as "Teflon" or the like.

When a cartridge is used in conjunction with the reel the supply of air to restrainer 30 may be shut off since the free end of the tape will not come in contact with the restrainer 30. Likewise when the reel is used without a cartridge the supply of air to restrainer 28 may be shut off.

Once the leading end of the tape enters the tape transport channel, the tape must traverse a relatively long path which may be curved, straight or combination curved and straight past the head assembly 50 to the take-up reel 6. A pair of housing members 46 and 48 are disposed on opposite sides of the head assembly 50 and are provided with a plurality of downwardly and angularly directed air ports 47 and 49, respectively. These ports may be connected to any suitable source of air under pressure. Additional members 52, 54 and 56 are mounted below the tape path on the opposite side of the tape path from the members 46 and 48. These lower members are provided with air ports 55 which may be connected to any suitable source of air under pressure. The jets of air issuing from these ports help to propel the tape toward the take-up reel while eliminating tape flutter. A pair of substantial gaps are located between the members 53 and 58 and between the members 54 and 56. These gaps are located above the vacuum columns 6 and 8 to facilitate feeding of the tape into the vacuum columns subsequent to being wound up on the take-up reel 14. While the greatest reliability of operation is achieved when both the upper and lower jets 47, 49 and 55 are operated the threading of the tape along the tape transport channel may be accomplished by using only the upper jets 47 and 49 or by using only the lower jets 55.

Thus it is seen that the tape transport channel is defined on the top surface thereof as a substantially continuous surface comprised of members 46, 48 and 50. The sides of the channel are formed as continuous surfaces. One side of the channel is comprised of the machine panel 41 upon which the various members 46, 48, 50 and 52 are mounted. The other side of the channel is formed by a closure door or the like (not shown) which may be closed into parallel relation with the panel 41 with the members 46, 48, 50 and 52 sandwiched therebetween. The bottom surface of the channel is formed by member 52 leaving relatively large open sections along the length of the bottom side of the channel between members 53 and 58 and between members 54 and 56.

Take-up reel 6 is mounted on spindle 14 of a tape drive not shown. For clarity, reel 6 is shown as made of transparent plastic although it can be made of any material. Spindle 14 can contain expansion locking devices of the conventional type such as operated by screw knob 14A for expanding spindle 14 inside reel hub 18 to lock the reel 6 on it. Adjacent to the back of reel 6, mounted on spindle 14 against shoulder 14B, is plenum chamber 17. The latter is connected by tube 11 to vacuum source V not shown. Chamber 17 has a slotted opening 13 which surrounds shoulder 14B. The width of slot 13 is narrow, except over an angle N for an additional sector opening 15.

The 360 degrees of slot 13 are in continuous engagement with ports 25 through the back side of hub 18, when mounted. Sector 15 only cooperates with a part of ports 27 in hub 18 to commutate vacuum to connected slots 21 and 22. Ports 27 are arranged in a circular array with a greater diameter than the circular array of ports 25. This greater diameter for opening 27 causes them to communicate only with sector 15 and not with slot 13. Thus, the vacuum from chamber 17 is commutated only with respect to openings 27 as they momentarily align with sector 15 over the angle N during rotation of reel 6.

Sets of openings 23 in the hub surface connect in common to ports 25 through holes 34 formed axially within hub 18. Each hole 34 terminates without passing through the front side, i.e., flange 16, of reel 6. Hence, openings 23 uniformly provide vacuum over the entire hub surface. Slots 21 and 22, however, communicate only with ports 27 through holes 35 formed axially within the hub parallel to holes 34.

Slots 21 are formed as grooves on the inner side of one flange 16 to only communicate with ports 27. Likewise, slots 22 are formed as grooves on the inner side of the other flange 16 to only communicate with ports 27 through holes 35. There are no openings for any of the holes 34 or 35 on the opposite side of reel 6 from ports 25 and 27.

Openings 23 are small with respect to the openings of slots 21 and 22. Thus, openings 23 do not result in a considerable draft of air due to the vacuum suction. However, the much larger slots 21 and 22 with their larger holes 35 and ports 27 create a substantial suctional draft of air between the reel flanges in the direction of the arrows. The direction is determined by the angular position of sector 15 about the tape drive spindle. This arrangement is useful in tape threading. When a tape end is distantly provided in the radial direction of sector 15, the tape end comes under the attraction of the large draft of air created from the commutated ports 21 and 22. This air draft brings the tape end very close to the hub, from which the attraction of the small ports 23 suck the tape end to the surface of the hub. If the hub is rotating, ports 23 bring and hold the tape end to the hub over its 360 degree circumference. After a few winds of the tape reel, the tape is frictionally locked by its own windings, so that the vacuum can be shut off with the tape threading being completed, after which normal tape drive operation can commence.

Thus, in operation, a reel 8 having a supply of tape thereon is placed on the hub 12 either with or without a cartridge. As the free end of the tape is automatically fed into the tape transport channel the flow of air from ports 47, 49 and 55 feeds the free end of the tape through the tape transport channel past the head 50 to the vicinity of the take-up reel 6. The free end of the tape will then be attracted to and held on the hub 18 of the reel 6 by the vacuum means associted with the reel 6. After a predetermined amount of tape is wound on the reel 6, the reel 6 ceases to rotate. The tape may then be fed back to the supply reel with the usual loops of tape depending downwardly into the vacuum columns. The members 53, 56 and 54 may be provided with antifriction surfaces such as air-lubricated surfaces or the like. The member 58 is a rotatable disc member adapted to drive the tape in either direction.

Obviously, many modifications and variations of the present invention are possible in the light of the above teachings. It is therefore, to be understood that within the scope of the appended claims, the invention may be practiced otherwise than as specifically described.

What is claimed is:

1. A pneumatic tape threading apparatus in combination with a tape handling machine having a supply reel and an open take-up reel rotatably mounted thereon for rotation about spaced parallel axes, tape head means mounted thereon intermediate said reels, a pair of slack tape vacuum columns each having an open end disposed adjacent each of said reels on opposite sides of said tape head means and tape transport channel means extending between said reels past said tape head and said open ended vacuum columns, the improvement comprising air jet means mounted along said channel means and angled relative thereto in the direction of tape threading movement with at least some of said air jets being located immediately adjacent the opened ends of said vacuum columns and angled to blow directly across the open ends of said vacuum columns to assist in the transport of a tape across said open ends.

2. A pneumatic tape threading apparatus as set forth in claim 1 further comprising additional air jets located along said channel means directly opposite said open ended vacuum columns.

3. The tape threading apparatus according to claim 1 wherein said take-up reel is comprised of an annular hub member and a pair of circular parallel flanges secured to opposite ends of said hub member, said reel having a plurality of openings formed in the circumference of said hub, and a plurality of radially directed slots formed in the opposed surfaces of said flanges adjacent said hub members, and means disposed in said hub for connecting said openings and slots to a vacuum source.

4. Tape threading means as defined in claim 3 including vacuum commutating means for communicating vacuum only to the slots oriented in the direction of tape reception.

(References on following page)

References Cited

UNITED STATES PATENTS

| | | | |
|---|---|---|---|
| 3,134,527 | 5/1964 | Willis | 242—55.13 |
| 3,254,854 | 6/1966 | Deighton et al. | 242—55.12 |
| 3,334,831 | 8/1967 | Bradt | 242—55.13 |

OTHER REFERENCES

I.B.M. Technical Disclosure Bulletin, vol. 8, No. 12, May 1966, pp. 1773–1774, commutated vacuum take-up reel, Nutter and Orlando.

GEORGE F. MAUTZ, *Primary Examiner.*